United States Patent [19]

Krantz et al.

[11] Patent Number: 5,279,206
[45] Date of Patent: Jan. 18, 1994

[54] VARIABLE DISPLACEMENT HYDROSTATIC DEVICE AND NEUTRAL RETURN MECHANISM THEREFOR

[75] Inventors: W. Douglas Krantz, Savage; Mark S. Jennen, Eden Prairie, both of Minn.

[73] Assignee: Eaton Corporation, Cleveland, Ohio

[21] Appl. No.: 82,526

[22] Filed: Jun. 25, 1993

Related U.S. Application Data

[63] Continuation of Ser. No. 914,168, Jul. 14, 1992, abandoned.

[51] Int. Cl.$^5$ .............................................. F01B 1/06
[52] U.S. Cl. ........................................ 91/497; 91/219; 91/220; 92/12.1; 92/13.1
[58] Field of Search ................... 91/219, 220, 497; 92/12.1, 13.1; 418/30

[56] References Cited

U.S. PATENT DOCUMENTS

| | | | |
|---|---|---|---|
| 3,084,562 | 4/1963 | Fitzpatrick | 91/497 X |
| 4,934,252 | 6/1990 | Giere | 91/497 |
| 4,968,227 | 11/1990 | Szulczewski | 91/497 X |

FOREIGN PATENT DOCUMENTS 565043  10/1944  United Kingdom ................ 91/497

Primary Examiner—Richard A. Bertsch
Assistant Examiner—Michael I. Kocharov
Attorney, Agent, or Firm—L. J. Kasper

[57] ABSTRACT

A variable displacement radial ball pump (11) is disclosed of the type in which the balls (59) are restrained by a cam ring (25), which is pivotable about a cam pivot pin (27) to vary the displacement of the pump. In accordance with the invention, in order to return the pump to absolute zero displacement, the pump is provided with a detent mechanism (65;83). The cam ring 25 has a neutral region (73) and a ramp surface (77), and a detent member (69;89) is biased into engagement with the neutral region when the cam ring is in neutral (FIGS. 2 and 3). When the cam ring is displaced from neutral, the detent member engages the ramp surface, against the bias force of a spring (71;91), which exerts a force tending to return the cam ring to neutral in the absence of an input to the control assembly (33).

17 Claims, 3 Drawing Sheets

VARIABLE DISPLACEMENT HYDROSTATIC DEVICE AND NEUTRAL RETURN MECHANISM THEREFOR

This application is a continuation of application Ser. No. 914,168, now abandoned, filed Jul. 14, 1992.

BACKGROUND OF THE DISCLOSURE

The present invention relates to variable displacement hydraulic devices, and more particularly, to neutral centering mechanisms for use in returning the controls of such a device from either a first or second displaced (operating) position, back to a neutral position.

Hydrostatic transmissions typically include variable displacement pump units, which include a fluid displacement mechanism, and some means operable to vary the displacement of the displacement mechanism in response to movement (typically rotation) of an input control member or control shaft. The present invention could also be used with a variable displacement motor unit, although the invention is especially adapted for use with a pump unit, and will be described in connection therewith.

Such variable displacement pump units are typically of the "over-center" type, i.e., the displacement mechanism may be displaced from a neutral position to either a first operating position (e.g., forward propel) or in the opposite direction to a second operating position (e.g., reverse propel). In such devices, it has proven to be very difficult to design and manufacture commercially acceptable control devices, by means of which the control shaft of the pump may be returned from either the first or second operation position to an "absolute neutral" position, i.e., a position of the control shaft corresponding to a zero displacement of the pump. On a vehicle in which the hydrostatic pump is part of the vehicle propulsion system, failure to find exact neutral may result in the pump still displacing a small quantity of fluid, and the vehicle "creeping" at a low speed, even when the operator has moved the control linkage to what is apparently the neutral position.

As is well known to those skilled in the art, one of the primary difficulties in designing and manufacturing such a neutral centering mechanism is that, typically, the ability of the mechanism to return the control shaft to absolute neutral is dependent upon the ability to maintain very close manufacturing tolerances on one or more of the parts of the mechanism.

An attempt to overcome the problem of manufacturing tolerances making it difficult to find absolute neutral in a repeatable and predictable fashion, is set forth in U.S. Pat. No. 4,934,252, for a "VARIABLE DISPLACEMENT PUMP OR MOTOR AND NEUTRAL CENTERING MECHANISM THEREFOR", assigned to the assignee of the present invention.

Although the device successfully eliminated the tolerance sensitivity of the neutral centering mechanism, its commercial success was limited by its cost and complexity. Furthermore, the mechanism of the cited reference would seem inherently to require that it be located on the control shaft, and external to the pump, thus permitting the mechanism to be subjected to corrosion and damage, and making it difficult to keep the mechanism properly lubricated.

SUMMARY OF THE INVENTION

Accordingly, it is an object of the present invention to provide an improved neutral return mechanism for a variable displacement hydrostatic device, wherein the mechanism is largely insensitive to manufacturing tolerances of the various parts of the mechanism, while at the same time, being relatively simple and inexpensive to manufacture and assemble.

It is another object of the present invention to provide a neutral return mechanism which accomplishes the above-stated object, and which may, conveniently, be located within the housing of the hydrostatic device, thereby protecting the mechanism from corrosion and damage, and facilitating lubrication of the mechanism.

It is a further object of the present invention to provide a neutral return mechanism which accomplishes the above-stated objects, wherein any looseness or "lost motion" which may exist in the control linkage will not adversely affect the ability of the mechanism to return the device to absolute neutral.

The above and other objects of the invention are accomplished by the provision of a variable displacement hydraulic device of the type including housing means defining a cavity, and a fluid displacement mechanism disposed within the cavity. The displacement mechanism is of the type comprising a cam ring defining a center of curvature, and a rotor assembly disposed within the cam ring and being rotatable about its axis. The displacement mechanism defines a neutral position in which the axis of rotation and the center of curvature coincide, and a first displaced position in which either the cam ring or the rotor assembly is laterally displaced in a first direction relative to the other. A control means is operable to move either the cam ring or the rotor assembly from the neutral position in the first direction in response to actuation thereof. A neutral return mechanism is operable to return the device to the neutral position from the displaced position.

The improved hydraulic device is characterized by the neutral return mechanism comprising detent means operably associated with the housing means and with either the cam ring or the rotor assembly. The detent means is operable to bias either the cam ring or the rotor assembly to the neutral position from a displaced position in response to the cam ring or rotor assembly being within a predetermined range of the neutral position, and in the absence of actuation of the control means. The detent means include energy storage means operable to store energy as either the cam ring or the rotor assembly is displaced from the neutral position.

DESCRIPTION OF THE PREFERRED EMBODIMENTS

Figure 1:
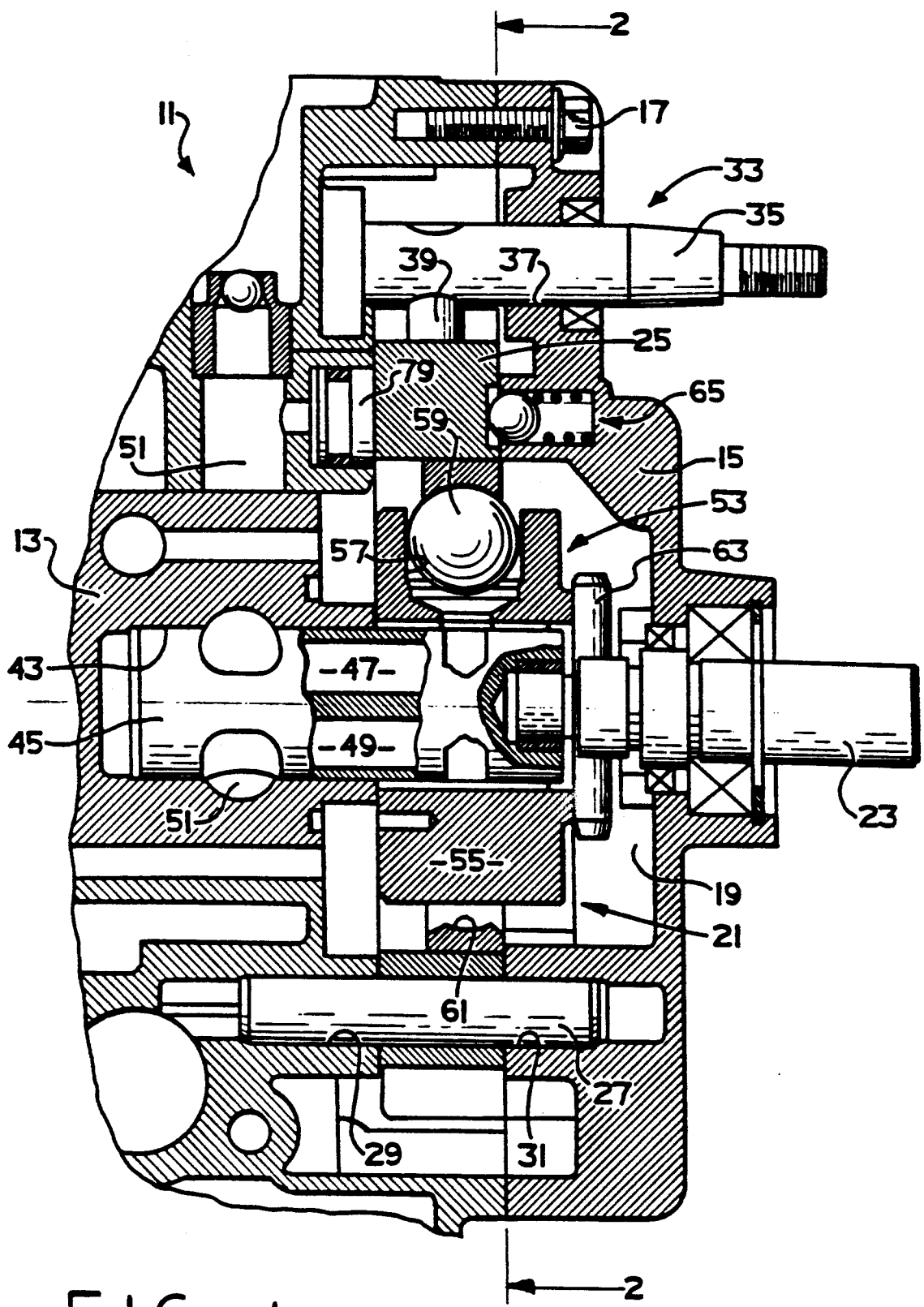
FIG. 1 is an axial cross-section of a variable displacement hydrostatic device of the type with which the present invention may be utilized.

Referring now to the drawings, which are not intended to limit the invention, FIG. 1 illustrates a variable displacement, radial ball hydrostatic pump of the general type which is illustrated and described in U.S. Pat. Nos. 4,091,717 and 4,968,227, both of which are assigned to the assignee of the present invention and incorporated herein by reference. The specific pump design illustrated in FIG. 1 is that used in conjunction with the model 751/851 hydrostatic transaxle manufactured and sold by the assignee of the present invention, although it should be understood that the specific design is illustrated herein merely as an example of the environment in which the present invention may be utilized.

The variable displacement radial ball pump of FIG. 1, generally designated 11, includes a body 13 and a cover member 15, the cover member 15 being attached to the body 13 by any suitable means, such as a plurality of bolts 17. The body 13 and cover member 15 cooperate to define a pump cavity 19, within which is disposed a pumping element, generally designated 21, to be driven by an input shaft 23.

Disposed within the pump cavity 19 is a cam ring 25, which is disposed to pivot about the axis of a cam pivot pin 27. The pivot pin 27 is received within a pair of aligned bores 29 and 31, defined by the body 13 and cover member 15, respectively. Pivotal movement of the cam ring 25 about the axis of the pin 27 is accomplished by means of a control assembly, generally designated 33. The control assembly 33 includes a control shaft 35, which is rotatably received within an opening 37 defined by the cover member 15. The outer end (right end in FIG. 1) of the control shaft 35 is threaded for attachment of appropriate control linkage (not shown herein). The inner end of the control shaft 35 has a control pin 39 extending diametrically through the shaft 35. The radially inner end of the control pin 39 is received in a generally cylindrical cam ring insert 41 (see FIG. 2), such that rotation of the control shaft 35 about its axis results in pivotal movement of the insert 41, and therefore, pivotal movement of the cam ring 25 about the axis of the pivot pin 27.

The body 13 defines a generally cylindrical bore 43, within which is press-fit a cylindrical support member 45. The member 45 defines a pair of axially-extending bores 47 and 49, the bore 47 comprising a low-pressure inlet passage, and the bore 49 comprising a high-pressure outlet passage. The support member 45 and the body 13 cooperate to define a high-pressure passage 51, seen in FIG. 1 both beneath and above the support member 45.

Surrounding the support member 45, and disposed within the cam ring 25 is a rotor assembly, generally designated 53, including a rotor member 55 which is journalled on the support member 45, and defines a plurality of circumferentially-spaced, radially-extending cylinder bores 57. Disposed in each of the bores 57 is a piston or ball 59, the balls being in engagement with, and restrained in the radial direction, by a concave race surface 61.

Disposed adjacent the forward end (right end in FIG. 1) of the rotor member 55 is a transversely-oriented drive pin 63, which is received by a pair of cut-out portions (not shown in FIG. 1). The drive pin 63 passes through an axially inner end of the input shaft 23.

Figure 2:
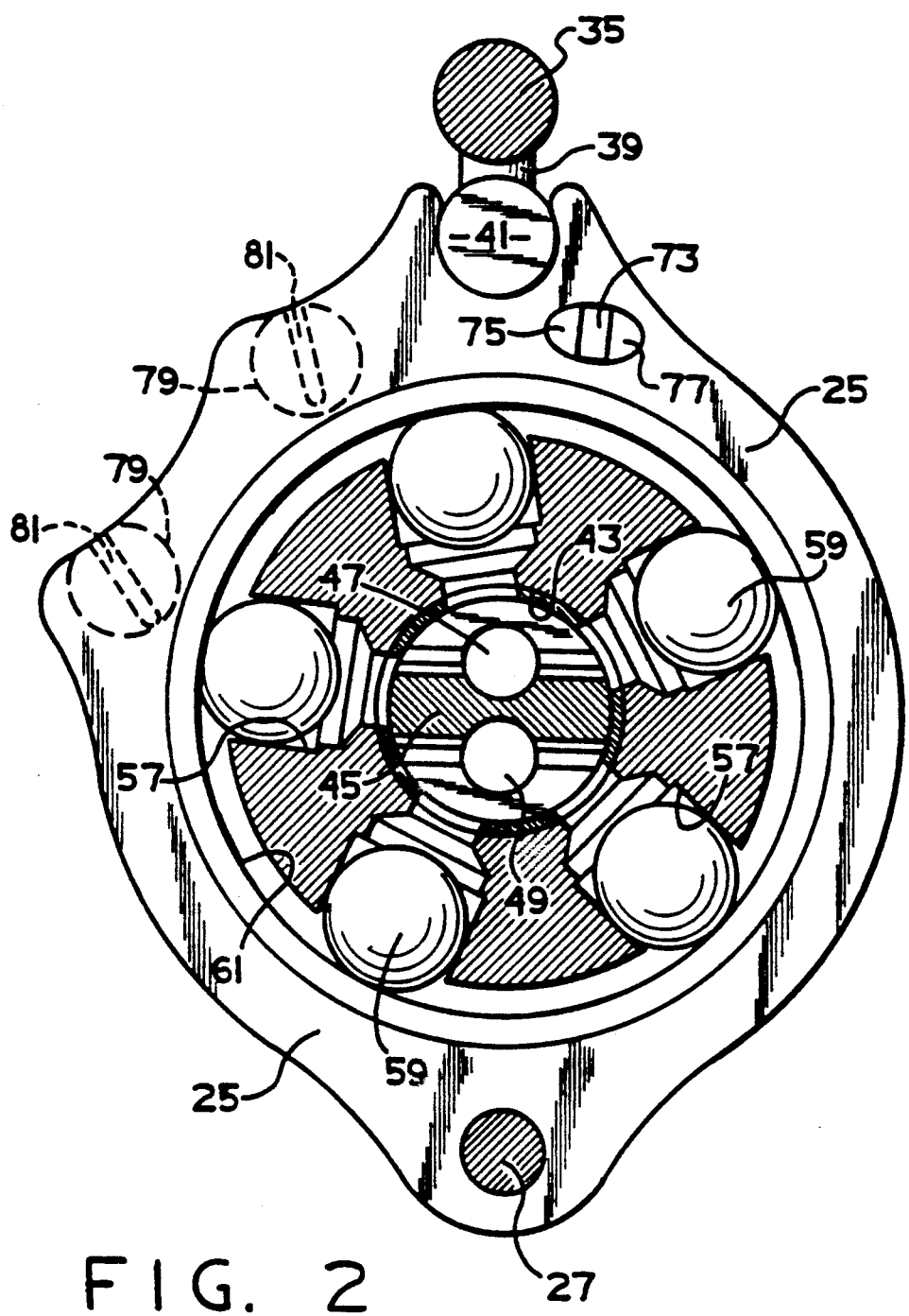
FIG. 2 is a transverse cross-section, taken on line 2—2 of FIG. 1, but showing primarily only the cam ring and rotor, and not the housing, and being on a slightly larger scale than FIG. 1.

Referring now primarily to FIG. 2, it may be seen that the control shaft 35 is rotated to its neutral position, and therefore, the cam ring 25 is pivoted to its neutral position in which the race surface 61 is concentric with the axis of the support member 45. With the cam ring 25 in its neutral position, rotation of the rotor member 55 does not result in any displacement, radially, of any of the balls 59, and therefore, there is no displacement of fluid by the rotor assembly 53, and no flow of pressurized fluid out of the pump 11. As was explained in the background of the present specification, it is one important aspect of the present invention to be able to return the cam member 25 exactly to its neutral position as shown in FIG. 2, so that there is absolutely zero flow of pressurized fluid from the pump 11, and as a result, any motors being driven by the output of the pump 11 will remain stationary, rather than moving slowly, during a time when it is the operator's intention that such motors have no output motion.

In accordance with one aspect of the present invention, a detent mechanism is provided which is operable to return the cam ring 25 to its absolute neutral position, such that there is absolutely zero flow output from the pump 11. The detent mechanism, generally designated 65, actually has both a detent function and a neutral return function, as will become apparent subsequently. As was mentioned in the brief description of the drawings, FIGS. 3 and 4 are axial cross-section views, taken on a plane perpendicular to the plane of FIG. 1.

Figure 3:
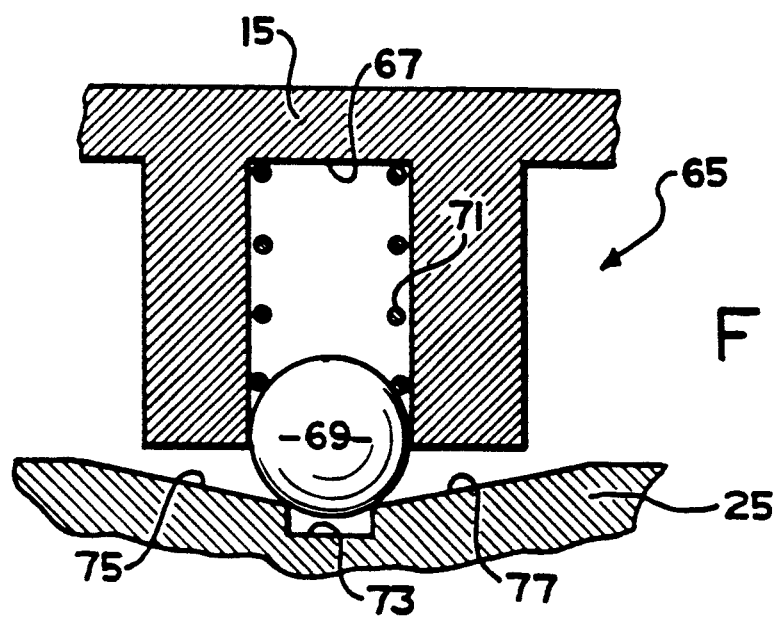
FIG. 3 is an enlarged, axial cross-section, on a plane perpendicular to the plane of FIG. 1, and with the detent of the present invention in its neutral position.

Referring now primarily to FIG. 3, the cover member 15 defines a generally cylindrical opening 67, within which is disposed a detent ball 69. The ball 69 is biased downward in FIG. 3, toward the cam ring 25, by a coiled compression spring 71, seated within the opening 67. With the cam ring 25 in its neutral, centered position, as shown in FIG. 3, the detent ball 69 is in engagement with the corner edges defined by the intersection of a neutral region 73 and clockwise and counter-clockwise ramp surfaces 75 and 77, respectively. The generally rectangular neutral region 73 (see FIG. 2) is referred to as a "region" instead of a "surface" because, as may best be seen in FIG. 3, the detent ball 69 does not actually engage the region 73, but only the corners defined at the boundaries thereof, as was described above.

Figure 4:
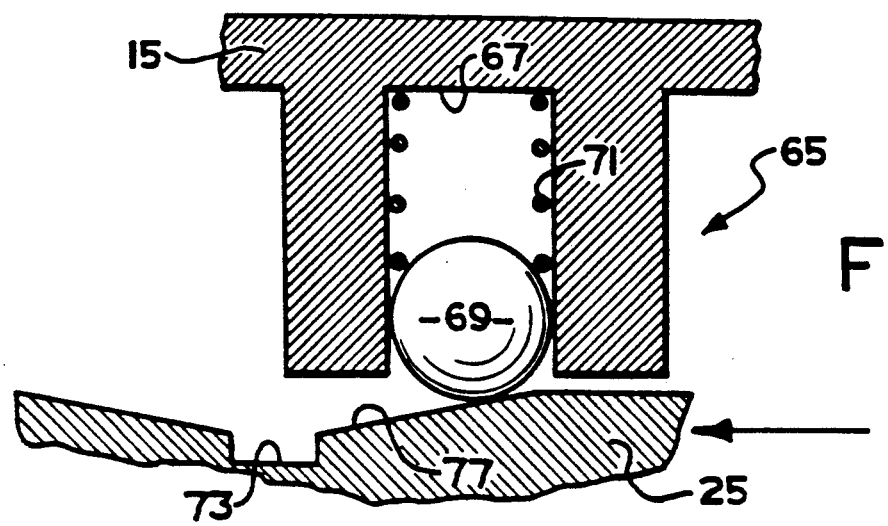
FIG. 4 is an axial cross-section, similar to FIG. 3, but with the detent mechanism of the present invention in a displaced position.

Referring now to FIG. 4, as the cam ring 25 is displaced from its neutral position, in a counter-clockwise direction about the axis of the pivot pin 27 (in FIG. 2), the cam ring 25 is displaced as shown by the arrow in FIG. 4. Such displacement of the cam ring 25 results in the detent ball 69 becoming disengaged from the neutral region 73, and being moved upward in FIG. 4 further into the opening 67, in opposition to the biasing force of the spring 71. As the cam ring 25 is displaced, the detent ball 69 is in engagement with the counter-clockwise ramp surface 77, with continued movement of the cam ring further compressing the spring 71. In the subject embodiment, and by way of example only, each of the ramp surfaces 75 and 77 represents approximately 2½ degrees of pivotal movement of the cam member 25, whereas full displacement of the rotor assembly 53 occurs after approximately 3 degrees of pivotal movement of the cam member.

With the cam ring 25 displaced to the position shown in FIG. 4, if the operator merely releases the control shaft 35, the biasing force of the spring 71, biasing the detent ball 69 against the ramp surface 77, will generate a force on the cam ring 25 tending to pivot it toward the neutral position (to the right in FIG. 4). It is believed to be within the ability of those skilled in the art to select an appropriate spring 71, and appropriate angles for the ramp surfaces 75 and 77, such that the detent mechanism 65 is operable to return the cam ring 25 to its exact neutral position, with the ball 69 engaging the neutral region 73, as shown in FIG. 3.

Referring again to FIG. 2, it will be apparent to those skilled in the art that the detent mechanism 65 could be located anywhere on the transverse surface of the cam ring 25 and still be generally operable. However, it should also be apparent that the detent mechanism 65 will function better if the neutral return force is applied to the cam ring 25 at a location which is as far as possible from the axis of the cam pivot pin 27, thus exerting the maximum possible return torque on the cam ring 25.

Within the scope of the present invention, the arrangement of the detent mechanism 65 could be reversed from that shown in FIG. 3, i.e., with the spring and detent ball received by the cam ring, and the ramp surfaces and the neutral region defined by the housing. However, in developing the subject embodiment of the invention, it was believed to be most convenient to utilize the arrangement shown in FIG. 3, especially in view of the fact that the surface of the cam ring 25 requires substantial machining and finishing anyway, and the cam ring is typically hardened, whereas the cover member 15 may comprise an aluminum casting, not normally appropriate for defining ramp surfaces.

Referring again to FIG. 2, there is illustrated, in dashed line form, a pair of dampening pistons, generally designated 79, the construction and function of which are disclosed in above-incorporated U.S. Pat. No. 4,091,717, which will not be described further herein. The dampening pistons 79 are shown in dashed line form in FIG. 2 because they are located on the opposite side of the cam ring 25 (see FIG. 1). Referring still to FIG. 2, operably associated with each of the dampening pistons 79 is a wideband neutral passage 81, the construction and function of which are disclosed in above-incorporated U.S. Pat. No. 4,968,227. One function of the wideband neutral passages 81 is to provide a wideband neutral overlap, i.e., a communication of any pressurized fluid to case drain, whenever the cam ring 25 is close to its neutral position, but not exactly at neutral. Preferably, the detent mechanism 65 of the present invention is used in conjunction with a wideband neutral arrangement such as that illustrated and described in above-incorporated U.S. Pat. No. 4,968,227, or an equivalent arrangement. If so, the required accuracy of the neutral region 73 and the ramp surfaces 75 and 77, relative to the opening 67 and the detent ball 69, is determined by the manufacturing tolerance of the wideband neutral passages 81. In other words, in the subject embodiment, the position of the passages 81, relative to the dampening pistons 79, has a tolerance of ±0.8 degrees, and therefore, the location of the region 73 and surfaces 75 and 77, relative to the opening 67, must also be within ±0.8 degrees, or the smallest tolerance range for the wideband arrangement, whichever is less.

Alternative Embodiment

Figure 5:
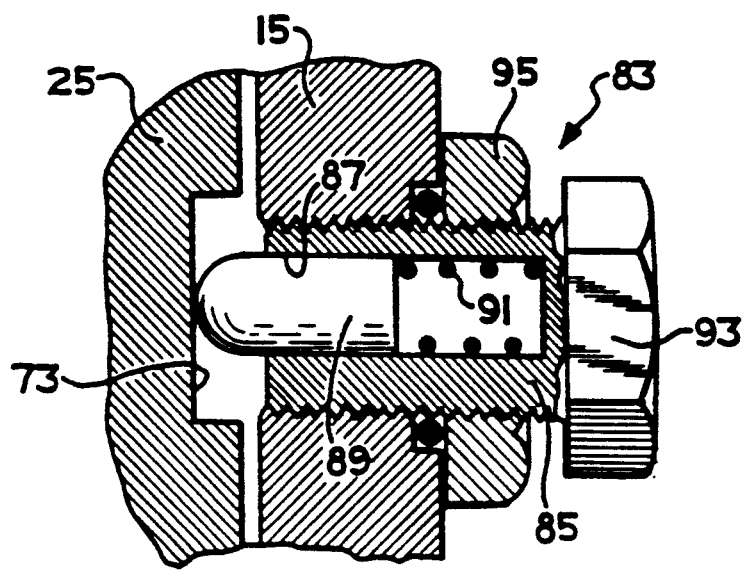
FIG. 5 is an axial cross-section, similar to FIGS. 3 and 4, but on the same plane as FIG. 1, illustrating an alternative embodiment of the present invention.

Referring now primarily to FIG. 5, there is illustrated an alternative embodiment of the invention which may be utilized in the event there is no wideband neutral arrangement, or if it does not appear to be possible or feasible to provide a tolerance for the detent mechanism 65 which is less than that of the wideband neutral. In FIG. 5, which is a view taken on the same plane as FIG. 1, there is an adjustable detent mechanism, generally designated 83, which comprises a threaded fitting 85, defining an axial bore 87, which is located eccentrically within the fitting 85. Disposed within the bore 87 is a generally cylindrical detent member 89, biased toward engagement with the cam ring 25 by means of a compression spring 91.

The fitting 85 includes a hex head 93, by means of which the fitting 85 may be rotated within the threaded opening in the cover member 15. Rotation of the fitting 85 will move the detent member 89 slightly circumferentially, to compensate for any out of tolerance condition, or misalignment, with the movement of the detent member 89, in turn, causing slight pivotal movement of the cam ring 25. When the fitting 85 has been rotated, with the detent member 89 engaging the neutral region 73, and absolute zero (no output flow) is located, a lock nut 95 may then be tightened against the outer surface of the cover member 15, thus preventing any subsequent rotation of the fitting 85.

It should be apparent to those skilled in the art that the non-adjustable detent mechanism 65 of FIGS. 3 and 4 could utilize a cylindrical detent member such as the member 87 of FIG. 5. Conversely, the adjustable mechanism 83 could utilize a ball, such as the detent ball 69 of the primary embodiment. Furthermore, various other configurations of the detent member could be utilized, within the scope of the invention. Similarly, although both embodiments of the present invention are illustrated as utilizing compression springs (71 or 91), it should be apparent that various other "energy storage means" could be utilized. In other words, all that is required is that, as the detent member (69 or 89) moves up the ramp surface 75 or 77, energy is being stored in such a manner that it will subsequently be available to exert a biasing force tending to return the cover member 15 and the cam ring 25 to the relative neutral position of FIG. 3. For example, it would be possible to utilize a small, fluid pressure accumulator as the energy storage means. However, in the subject embodiment, the compression springs 71 and 91 were utilized for purposes of simplicity of illustration and low cost.

The present invention has been illustrated in conjunction with a variable displacement device in which there is a rotor which is fixed to rotate about its axis, and displacement is varied in response to pivotal movement of a cam member. The invention could also be utilized in a device in which the cam member is fixed, and displacement is varied by moving the rotor linearly, relative to the cam, or in a device in which the rotor is fixed, and displacement is varied by moving the cam member linearly, relative to the rotor. Therefore, it should be understood that, as used herein and in the subsequent claims, references to lateral displacement should be understood to mean and include both pivotal movement of a cam ring relative to a fixed-axis rotor assembly, as well as relative linear motion between a cam and rotor.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A variable displacement hydraulic device of the type including housing means defining a cavity, and a fluid displacement mechanism disposed within said cavity; said displacement mechanism being of the type comprising a cam ring defining a center of curvature, and a rotor assembly disposed within said cam ring and being rotatable about its axis, said displacement mechanism defining a neutral position in which said axis of rotation and said center of curvature coincide, and a first displaced position in which one of said cam ring and said rotor assembly is laterally displaced in a first direction relative to the other thereof; control means operable to move said one of said cam ring and said rotor assembly from said neutral position in said first direction in response to actuation thereof, from an external input; and a neutral return mechanism operable to return said variable displacement hydraulic device to said neutral position from said displaced position; characterized by:
   (a) said neutral return mechanism comprising detent means operably associated with said housing means and with said one of said cam ring and said rotor assembly, said detent means being independent of said control means;
   (b) said detent means being operable to bias said one of said cam ring and said rotor assembly to said neutral position from a displaced position in response to said one of said cam ring and said rotor assembly being within a predetermined range of said neutral position, and in the absence of actuation, from said external input, of said control means;
   (c) said detent means including a detent member and energy storage means in direct engagement with said detent member and operable to store energy as said one of said cam ring and said rotor assembly is displaced from said neutral position.

2. A variable displacement hydraulic device as claimed in claim 1, characterized by said detent means comprises said one of said cam ring and said rotor assembly defining a neutral region and a first ramp surface, said detent means further comprising a detent member operably associated with said housing means, and biased into engagement with said first ramp surface by said energy storage means as said one of said cam ring and said rotor assembly is displaced in said first direction from said neutral position.

3. A variable displacement hydraulic device as claimed in claim 2, characterized by said energy storage means comprises said housing means defining a spring seat, and further comprising a compression spring member disposed in engagement with said spring seat.

4. A variable displacement hydraulic device as claimed in claim 3, characterized by said compression spring member biasing said detent member into engagement with said neutral region when said one of said cam ring and said rotor assembly is in said neutral position.

5. A variable displacement hydraulic device as claimed in claim 1, characterized by said axis of rotation of said rotor assembly being fixed relative to said housing means, and said cam ring and said center of curvature being movable relative to said rotor assembly.

6. A variable displacement hydraulic device as claimed in claim 5, characterized by said cam ring being pivotable about a cam pivot means from said neutral position, in said first direction, to said displaced position.

7. A variable displacement hydraulic device as claimed in claim 5, characterized by said control means comprising a control shaft rotatable about its axis, and means operable to transmit rotation of said control shaft into pivotal movement of said cam ring about said cam pivot means.

8. A variable displacement hydraulic device as claimed in claim 7, characterized by said detent means comprising said cam ring defining a neutral region and a first ramp surface, and a detent member being operably associated with said housing means; said neutral region and first ramp surface being disposed generally diametrically from said cam pivot means, about said center of curvature.

9. A variable displacement hydraulic device as claimed in claim 1, characterized by said displacement mechanism defining a second displacement position in which said one of said cam ring and said rotor assembly is laterally displaced in a second direction relative to the other thereof, said detent means being operable to bias said one of said cam ring and said rotor assembly to said neutral position from said second displaced position.

10. A variable displacement hydraulic device as claimed in claim 9, characterized by said detent means comprising said cam ring defining a neutral region and first and second ramp surfaces, said ramp surfaces being oppositely disposed about said neutral surface, said detent means further comprising a detent member operably associated with said housing means; said detent member being biased into engagement with said first ramp surface by said energy storage means as said cam ring is displaced in said first direction from said neutral position, and into engagement with said second ramp surface by said energy storage means as said cam ring is displaced in said second direction from said neutral position.

11. A variable displacement hydraulic device of the type including housing means defining a cavity, and a fluid displacement mechanism disposed within said cavity; said displacement mechanism being of the type comprising a cam ring defining a center of curvature, and a rotor assembly disposed within said cam ring and being rotatable about its axis, said displacement mechanism defining a neutral position in which said axis of rotation and said center of curvature coincide, and a first displaced position in which one of said cam ring and said rotor assembly is laterally displaced in a first direction relative to the other thereof; control means operable to move said one of said cam ring and said rotor assembly from said neutral position in said first direction in response to actuation thereof; and a neutral return mechanism operable to return said variable displacement hydraulic device to said neutral position from said displaced position; characterized by:
   (a) said neutral return mechanism comprising detent means operably associated with said housing means and with said one of said cam ring and said rotor assembly;
   (b) said detent means being operable to bias said one of said cam ring and said rotor assembly to said neutral position from a displaced position in response to said one of said cam rings and said rotor assembly being within a predetermined range of said neutral position, and in the absence of actuation of said control means;

(c) said detent means including energy storage means and a detent member movable in a direction generally perpendicular to a transverse plane defined by said lateral displacement of said one of said cam ring and rotor assembly, said energy storage means being operable to store energy in response to said movement of said detent member, as said one of said cam ring and said rotor assembly is laterally displaced from said neutral position.

12. A variable displacement hydraulic device as claimed in claim 11, characterized by said detent means comprises said one of said cam ring and said rotor assembly defining a neutral region and a first ramp surface lying in a transverse surface oriented generally perpendicular to said axis of rotation, said detent member being movable in a direction generally parallel to said axis of rotation, as said one of said cam ring and said rotor assemblies is laterally displaced between said neutral position and said first displaced position.

13. A variable displacement hydraulic device as claimed in claim 12, characterized by said energy storage means comprises said housing means defining a spring seat disposed adjacent said transverse surface of said one of said cam ring and rotor assembly, and further comprising a compression spring member disposed in engagement with said spring seat.

14. A variable displacement hydraulic device as claimed in claim 12, characterized by said axis of rotation of said rotor assembly being fixed relative to said housing means, and said cam ring and said center of curvature being movable relative to said rotor assembly, said transverse surface defining said neutral region and said first ramp surface being defined by said cam ring.

15. A variable displacement hydraulic device as claimed in claim 14, characterized by said cam ring being pivotable about a cam pivot means from said neutral position, in said first direction, to said displaced position, said control means comprising a control shaft rotatable about its axis, and means operable to transmit rotation of said control shaft into pivotal movement of said cam ring about said pivot means.

16. A variable displacement hydraulic device as claimed in claim 11, characterized by said displacement mechanism defining a second displacement position in which said one of said cam ring and said rotor assembly is laterally displaced in a second direction relative to the other thereof, said detent means being operable to bias said one of said cam ring and said rotor assembly to said neutral position from said second displaced position.

17. A variable displacement hydraulic device as claimed in claim 16, characterized by said detent means comprising said cam ring defining a neutral region and first and second ramp surfaces, said ramp surfaces being oppositely disposed about said neutral surface, said detent means further comprising a detent member operably associated with said housing means; said detent member being biased into engagement with said first ramp surface by said energy storage means as said cam ring is displaced in said first direction from said neutral position, and into engagement with said second ramp surface by said energy storage means as said cam ring is displaced in said second direction from said neutral position.

* * * * *